Apr. 3, 1923
E. P. EFFERTZ
SELF COMPUTING LEVEL ROD
Filed Nov. 6, 1920
1,450,360
2 sheets-sheet 1
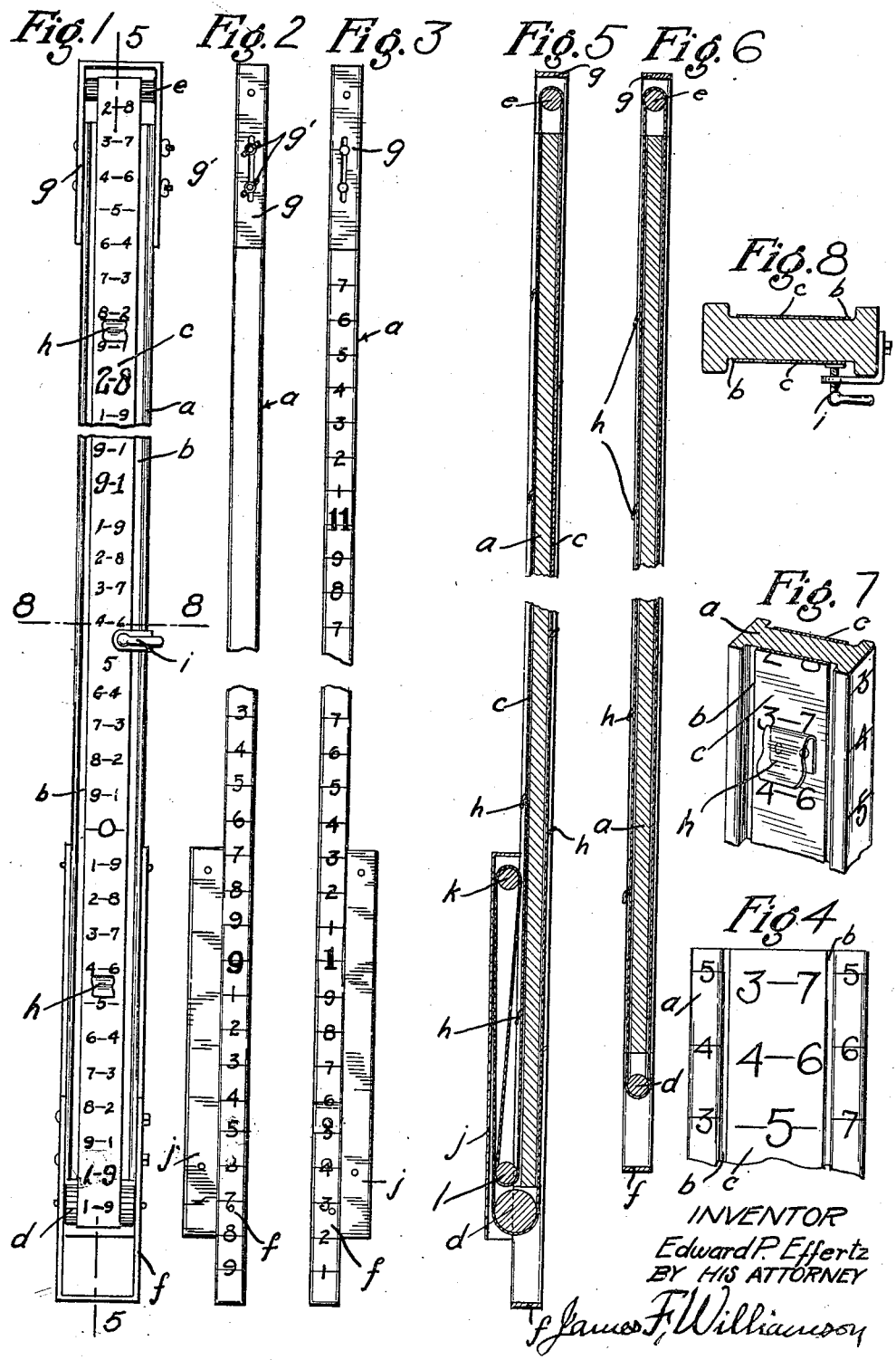

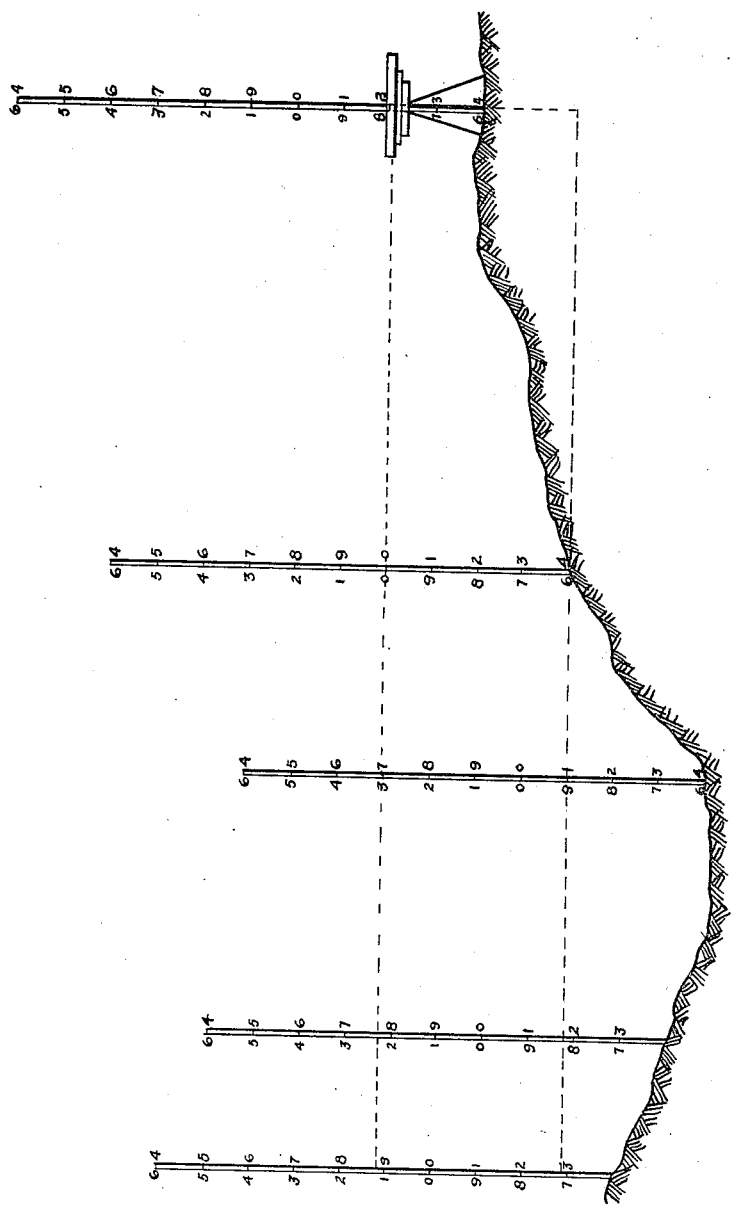

Patented Apr. 3, 1923.

1,450,360

UNITED STATES PATENT OFFICE.

EDWARD P. EFFERTZ, OF WINONA, MINNESOTA.

SELF-COMPUTING LEVEL ROD.

Application filed November 6, 1920. Serial No. 422,196.

*To all whom it may concern:*

Be it known that I, EDWARD P. EFFERTZ, citizen of the United States, residing at Winona, in the county of Winona and State of Minnesota, have invented certain new and useful Improvements in Self-Computing Level Rods; and I do hereby declare the following to be a full, clear, and exact description of the invention, such as will enable others skilled in the art to which it appertains to make and use the same.

My invention has for its object to provide a simple and highly efficient self-computing level rod. To this end, it consists of the novel devices and combinations of devices hereinafter described and defined in the claims.

My invention is intended to be used for what is known in engineering work as "differential leveling," "profile leveling," "cross sectioning" and "slope staking." The "cuts" and "fills" may be immediately ascertained from my rod without any computation, thus saving much time and also greatly decreasing the chances of probable error.

The invention is illustrated in the accompanying drawings, wherein like characters refer to like parts throughout the several views.

Referring to said drawings:—

Fig. 1 is a front elevation of a level rod designated as type "B";

Fig. 2 is a side elevation of the same;

Fig. 3 is an elevation of the opposite side of the same rod;

Fig. 4 is an enlarged front elevation of a portion of a level rod designated as type "A";

Fig. 5 is a vertical section through the line 5—5 of Fig. 1;

Fig. 6 is a longitudinal vertical section of my type "A" rod;

Fig. 7 is a perspective elevation of a portion of the front and a side of my rods;

Fig. 8 is an enlarged horizontal section taken through the line 8—8 of Fig. 1; and Fig. 9 is a diagrammatical view showing the manner of using my rod in engineering work.

The small arabic *a* indicates the framework of my rod, preferably made of wood having narrow sides and relatively wide front and rear faces. The said faces have longitudinal grooves *b* to accommodate a longitudinal endless ribbon *c*. One of the said sides has a zero point located ten feet from the bottom thereof and is scaled progressively from this zero point downward, and the other is scaled progressively from zero at the bottom upwards, as shown in Figs. 2 and 3. Instead of these side scales, they may be put on the two outer longitudinal edges of the front face, as shown in Fig. 4.

The said ribbon *c* is always made in multiples of ten feet and is marked with two scales on its outer surface, these scales being continuous around the ribbon and graduated repeatedly from zero to 10 the zero points being designated by the figures indicating feet. The zero marks are the same for both scales and from one of these zero points the scale on one side is graduated upwardly above the zero, and as 9, 8, 7, etc., downwardly below the same. The other scale is graduated upwardly below the zero mark and downwardly, as 9, 8, 7, etc., above the zero. The numbers at each side of the ribbon are thus reversely arranged from zero to 9, throughout the length thereof.

My invention assumes two forms which shall be designated as type A and B. They are similar, except for the application to type B of a take-up device which will soon be described. The similar and corresponding parts of these two types shall be lettered alike.

Returning to the parts, the ribbon *c* is supported by and rolls over two axially aligning rollers *d* and *e* mounted near the two extremities of my rods. A lower end bracket *f* is bolted to the bottom of said frame *a*, on which the roller *d* is mounted. In my type B rod, this bracket *f* also includes a housing for the take-up device already spoken of.

At the top of my rod, is a slotted adjustable stretching bracket *g*, provided with turn-screws *g'* fastened to said frame *a*, which secure the same in a desired position. This stretching bracket carries the roller *e* and allows the ribbon *c* to be made taut by varying vertically the position of said roller *e*.

A plurality of small pulling tags *h* are secured to the outer surface of the ribbon *c*, affording means for moving and setting said ribbon.

A suitable clamping device *i* is bolted to the frame *a* of the rod engaging said ribbon *c* and holding it firmly when set, The formerly mentioned take-up device on my type B rod, best shown in Fig. 5, is entirely housed and mounted in the bracket *f* of Fig. 5. A housing *j* is part of the said bracket. In this housing, are mounted two take-up rollers *k* and *l*. The steel ribbons come in ten, twenty, thirty and forty foot lengths and if a rod is of a length which is not a multiple of 5, the standard ribbons will not exactly fit the same when the rod is of the type A. Take for example, a 13 foot rod, which is a common length. This would require a 30 foot ribbon and would have 4 feet of slack. To take up this slack, the ribbon is passed beneath a larger roller *d* than the corresponding roller *d* on type A, over the take-up roller *k*, around the take-up roller *l*, and comes out in alignment with the top roller *e*, around which it is connected to its other end, forming an endless ribbon.

*Operation.*

Fig. 9 shows how my improved self-computing level rod may be used. The zero mark on the movable ribbon is set with the line of sight, when the bottom of the rod is at the level of the desired grade. Then in any sight taken, the amount of "cut" or "fill" may be read directly off of the proper scale on the ribbon, without any computation.

The purpose of the additional fixed scales is to permit the setting of the zero point of the movable ribbon for a minus or plus grade rod in "slope staking" work. The fixed scale on one side is used with the both scales on the ribbon for a plus grade rod and the fixed scale on the other side is likewise used with the both scales on the ribbon for a minus grade rod. The zero point of the ribbon scale is set at a point on the fixed scale corresponding to the difference between the height of the instrument and the grade. When the zero point is thus once set, the amount of cut or fill again may be read right off the ribbon scale. In Fig. 9, the lower dotted line represents the grade. By having the ribbon in multiples of ten, the same can be read for two digit numbers, as far as the length of the rod will permit.

It is to be understood that this invention is capable of further variation in form without changing the spirit of the invention. The movable ribbon is always a single one and has in its outer surface the two described scales working in combination with or apart from the fixed scales as the case may be. In working with a hand level instead of a tripod magnifying level, the ribbon is set and used alone.

What I claim is:—

1. A level rod comprising a rod member provided with a scale at each side thereof, said scales reading in opposite direction, a ribbon arranged on said rod to move between said scales, said ribbon having scales on its outer face adjacent the scales on said rod member, the scales on said ribbon reading in opposite directions to each other.

2. A self-computing level rod including a longitudinally movable endless ribbon having a scale adjacent each edge of its outer surface, said scales being continuous and numbered in opposite directions from a common zero point.

3. A level rod comprising a rod member having a fixed scale at each side thereof, one of which is numbered upward from a zero mark at the bottom of the rod and the other of which is numbered downward from a zero mark located ten units above the said point, and an endless ribbon arranged to travel between said scales having a scale adjacent each edge of its outer surface cooperating with the adjacent fixed scale.

4. The structure set forth in claim 3, the scales on the ribbon reading in opposite directions.

5. A self-computing level rod comprising a rod member having a fixed scale at each side thereof, an endless ribbon mounted thereon to move between said scales and also provided with a scale at each edge of its outer surface, a slotted bracket mounted for adjustment on said rod and adapted to be clamped thereto in various positions, said rod carrying a roller over which the ribbon runs whereby the ribbon can be tightened, and a take-up device to accommodate the slack of the ribbon when the same is more than twice the length of the rod.

6. A level rod comprising a rod member having a fixed scale at each side thereof, an endless ribbon mounted thereon and longitudinally movable between said scales, said ribbon having a scale adjacent each edge of its outer surface, a plurality of small pulling tags secured to said ribbon to move therewith and to engage the rod to hold the ribbon in set position, and a clamping device on said rod engaging the ribbon to secure the same in set position.

In testimony whereof I affix my signature.

EDWARD P. EFFERTZ.